United States Patent [19]

Asano et al.

[11] Patent Number: 4,834,573
[45] Date of Patent: May 30, 1989

[54] CAP FITTING STRUCTURE FOR SHAFT MEMBER

[75] Inventors: Kazunori Asano, Kamakura; Toshihiko Aoki, Yokohama, both of Japan

[73] Assignees: Kato Hatsujo Kaisha, Ltd.; Ohi Seisakusho Co., Ltd., both of Kanagawa, Japan

[21] Appl. No.: 206,736

[22] Filed: Jun. 15, 1988

[30] Foreign Application Priority Data

Jun. 16, 1987 [JP]  Japan ............... 62-91420[U]

[51] Int. Cl.[4] .................................................. B25G 3/00
[52] U.S. Cl. ..................................... 403/344; 403/383
[58] Field of Search ................... 403/344, 383, 361

[56] References Cited

U.S. PATENT DOCUMENTS

| 728,118 | 5/1903 | Lehmann | 403/383 X |
| 4,166,708 | 9/1979 | Lafferty, Sr. | 403/344 X |
| 4,355,921 | 10/1982 | Rousseau | 403/361 X |

FOREIGN PATENT DOCUMENTS 1341967  9/1963  France ........................ 403/383

Primary Examiner—Andrew V. Kundrat
Attorney, Agent, or Firm—Wenderoth, Lind and Ponack

[57] ABSTRACT

A fitting structure includes a shaft member of metal provided at the leading end part thereof with check projections formed integrally thereon, and a cap of synthetic resin formed of a main body and a lid member. The main body is provided therein with an insertion groove permitting insertion therein of the leading end part of the shaft member provided with the check porjections. The insertion groove is adapted to be closed by the lid member of the cap. Owing to this structure, the cap can be fitted to the leading end of the shaft member by a single operation of closing the insertion groove with the lid member. The fitting work involved in the structure of this invention, therefore, is extremely simple. While the cap is formed of the two component parts, i.e. the main body and the lid member, neither the main body nor the lid member is required to have any screw thread therein. Thus, the metal mold to be used for the formation of the cap is inexpensive and the cap itself can be produced inexpensively.

2 Claims, 2 Drawing Sheets

4,834,573

CAP FITTING STRUCTURE FOR SHAFT MEMBER

BACKGROUND OF THE INVENTION AND PRIOR ART STATEMENT

This invention relates to a structure for fitting a cap made of synthetic resin onto the leading end of a shaft member made of metal such as a lock shaft inserted into a brake shaft in a side braking system of an automobile, for example.

Where the leading end of the shaft member made of metal such as the lock shaft is to be ornamented or covered by fitting the cap made of synthetic resin onto the leading end of the shaft member, as illustrated in FIG. 1, it has been customary to have a male screw thread 2 formed on the leading end part 1a of a metallic shaft member 1, separately have a female screw thread 4 for helical insertion therein of the male screw threaded leading end part 1a formed inside a synthetic resin cap 3, and to fit the cap 3 to the leading part 1a of the shaft member 1 by helical engagement of the female screw thread 4 and the male screw thread 2 on the leading end part 1a.

The conventional threaded fitting structure described above, therefore, ensures strong fitting of the cap 3 to the leading end part 1a of the shaft member 1.

Since the conventional threaded fitting structure requires the male screw thread 2 to be formed on the leading end part 1a of the metallic shaft member 1, however, the fabrication of the shaft member 1 of course is a highly troublesome work. Moreover, the cap 3 made of resin requires the female screw thread 4 to be integrally formed therein at the same time that the cap 3 itself is formed in a stated shape. Thus, the mold to be used therefor is unduly complicated and is very expensive. As a result, the cap 3 itself is very expensive.

Moreover, the conventional threaded fitting structure entails highly complicated fittting work because the cap 3, during the course of fitting to the leading end part of the shaft member 1, must be held fast and rotated about its axis.

OBJECT AND SUMMARY OF THE INVENTION

The main object of this invention is to provide a fitting structure which, by a very simple single operation, enables a cap made of synthetic resin to be fitted to the leading end part of a metallic shaft member.

To accomplish this object, the present invention provides a fitting structure which comprises a shaft member made of metal and provided at the leading end thereof with a check projection and a cap made of synthetic resin and composed of a main body and a lid member, the main body of the cap being provided with an insertion groove adapted to accomodate therein the check projection-containing leading end part of the shaft member and keep it shut therein with the aid of the lid member.

The fitting structure contemplated by this invention is such that the metallic shaft member is provided with a pair of check projections extending outwardly from the opposite sides of the leading end part thereof, that the main body of the cap is provided with a stepped part to be covered with the lid member, a roughly cruciform insertion groove extends in the longitudinal direction at the center of the stepped part for permitting insertion therein of the leading end part containing the pair of check projections, and engaging claws are provided on the opposite lateral walls of the stepped part, and that the lid member of the cap is provided with fixing holes formed in the lateral walls so as to catch hold of the engaging claws of the main body and a retainer part having a shape roughly similar to the shape of the cruciform insertion groove of the main body and serving the purpose of closing the insertion groove.

Particularly, the fitting structure further comprises a coil spring adapted to be wound tightly around the main body of the cap and the lid member.

The above and other objects and characteristic features of this invention will be described in detail below with reference to the accompanying drawings.

DETAILED DESCRIPTION OF THE PREFERRED EMBODIMENT

Now, the present invention will be described in detail with reference to the illustrated embodiment.

Figure 1:
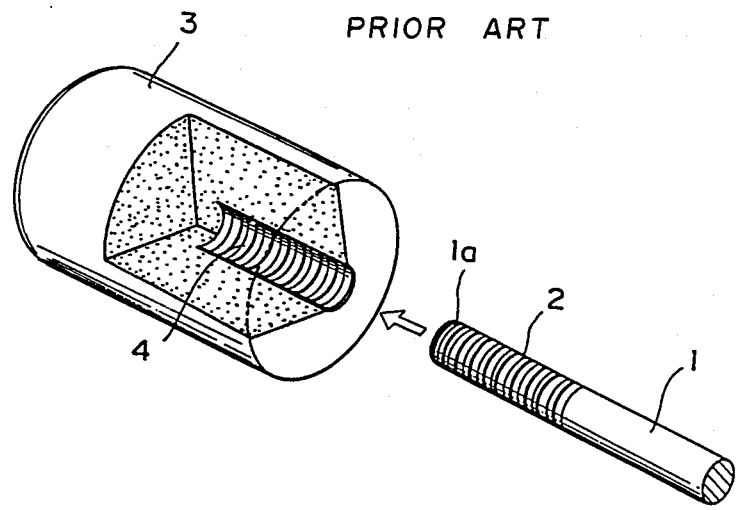
FIG. 1 is a perspective view illustrating the conventional cap fitting structure in a disasssembled state.
Figure 2:
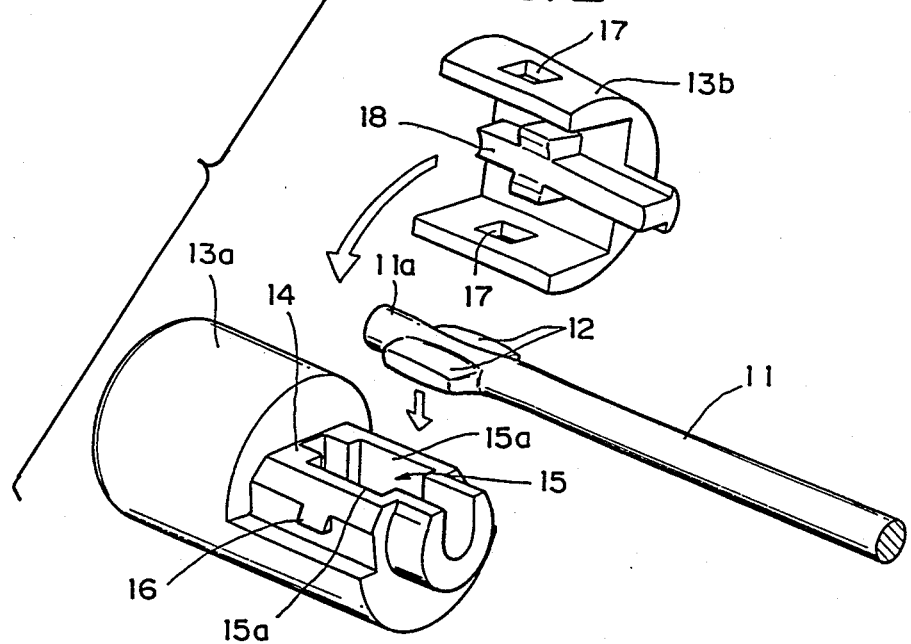
FIG. 2 is an exploded perspective view illustrating one embodiment of the cap fitting structure according to the present invention.

The fitting structure of this embodiment operates on the principle that a cap made of synthetic resin is fitted to the leading end of a shaft member made of metal. It is characterized by the fact that a metallic shaft member 11, unlike the conventional shaft member, is provided at the leading end part 11a thereof with a pair of integral check projections 12 extending outwardly from the opposite sides thereof and a cap 13 made of synthetic resin is composed of two component parts, i.e. a main body 13a and a lid member 13b as illustrated in FIG. 2.

The main body 13a of the cap 13 of resin has a stepped part 14 formed on one side thereof which is adapted to be covered with the lid member 13b. It has an insertion groove 15 extending in the longitudinal direction which has a diametrically extending cruciform portion at the center of the stepped part 14 adapted to permit insertion therein of the leading end part 11a of the shaft member 11 provided with check projections 12. It further has engaging claws 16 integrally formed on the opposite lateral walls of the stepped part 14.

The opposite lateral groove parts 15a which define the cruciform portion of the insertion groove 15 are sized to permit tight insertion therein of the pair of projections 12 formed on the leading end part 11a of the shaft member 11.

The lid member 13b of the resin cap 13 is has a cross-section roughly in the shape of the inverted letter U as illustrated. It has fixing holes 17 formed in the lateral walls thereof adapted to have the engaging claws 16 of the main body 13a engaged thereon. It has a retainer part 18 of a shape roughly similar to that of the cruciform portion of the insertion groove 15 of the main body 13a formed on the inner wall surface in the top part thereof and having a length to engage the projections 12 in the cruciform part when the engaging claws 16 are engaged in the fixing holes 17, with the result that the stepped part 14 of the main body 13a will be covered with the lid member 13b and the insertion groove 15 will be consequently closed perfectly and filled with the retainer part 18.

In the present embodiment, therefore, the fitting of the cap 13 of resin to the leading end part 11a of the metallic shaft member 11 is attained by first inserting the leading end part 11a of the shaft member 11 provided with the check projections 12 into the cruciform portion of the insertion groove 15 of the main body 13a of the cap 13, then bringing the engaging claws 16 into fast contact with the fixing holes 17, covering the stepped part 14 of the main body 13a with the lid member 13b, thereby causing the retainer part 18 of the lid member 13a to advance into the insertion groove 15 and press the leading end part 11a of the shaft member 11. As a result, the insertion groove 15 is perfectly closed and the leading end part 11a of the shaft member 11 is locked safely inside the insertion groove 15 as illustrated in FIGS. 3(A) and 3(B).

In consequence of the perfect fitting attained as described above, the leading end part 11a of the shaft member 11 and the cap 13 are securely joined to each other and the possibility of the leading end part 11a of the shaft member 11 being accidentally rotated inside the insertion groove 15 is prevented.

Moreover, since the shaft member 11 is provided on the leading end part 11a thereof with the pair of check projections 12 and the check projections 12 are tightly inserted in the groove parts 15a defining the cruciform part of the insertion groove 15, there is absolutely no possibility of the shaft member 11 accidentally producing idle play within the insertion groove 15 or slipping out of the insertion groove 15.

Figure 3:
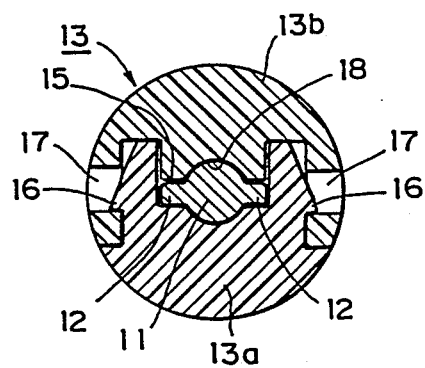
FIGS. 3(A) and 3(B) are cross sections illustrating the cap fitted to the leading end of the shaft member as viewed in different directions.
Figure 3:
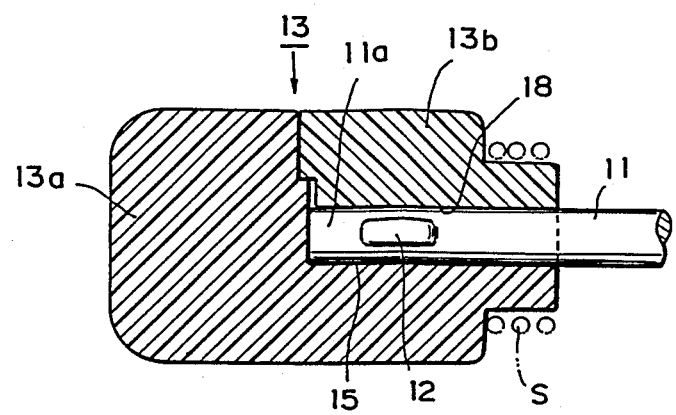

In the actual fitting operation, a coil spring S is tightly wound around the outer boundaries of the various protuberances of the main body 13a and the lid member 13b, the component parts of the cap 13, as illustrated in FIG. 3(B), which causes the lid member 13b to be fastened with increased fastness to the main body 13a. Where the fitting structure is required to have a strong fit, therefore, it is preferable to make additional use of the coil spring S.

The fitting structure of the present invention is characterized, as described above, by the fact that the shaft member is provided on the leading end part thereof with integrally formed check projections, that the cap is formed of two component parts, the main body and the lid member, and that the main body is provided with an insertion groove adapted to permit insertion therein of the leading end part of the shaft member provided with the check projections, whereby the insertion groove of the main body can be tightly closed with the lid member. It is, therefore, capable of securely fitting the resin cap to the leading end part of the metallic shaft member by simple operations of inserting the leading end part of the shaft member into the insertion groove of the cap, and closing the insertion groove with the lid member. The fitting work involved in the fitting structure of the present invention is conspicuously simple as compared with that involved in the conventional fitting structure. Indeed the cap is composed of the two component parts, i.e. the main body and the lid member. Since neither the main body nor the lid member is required to have any screw thread therein, the metal mold used for the formation of the cap is inexpensive and the cap itself cab be produced inexpensively.

What is claimed is:

1. A fitting structure comprising:
   a shaft member made of metal and having check projections at the leading end thereof projecting laterally from the opposite sides thereof;
   a cap made of synthetic resin and having a main body and a lid member, said main body having a stepped part for receiving said lid member thereover, said stepped part having a longitudinally extending insertion groove therein having a transversely extending roughly cruciform shape portion for accomodating therein said check projections and the leading end of said shaft member, said stepped part having engaging claws on the opposite lateral walls thereof, and said lid member having fixing holes in the opposite lateral walls thereof for engaging said engaging claws for holding said lid on said main body, and said lid member further having a retaining part having a shape roughly similar to the shape of said cruciform portion of said insertion groove and extending into said insertion groove to engage the leading end of said shaft therein when said lid is in position on said main body.

2. A fitting structure as claimed in claim 1 further comprising a coil spring tightly wound around the outer periphery of said main body and said lid member.

* * * * *